Dec. 29, 1942. E. C. ALLEN 2,306,855
ARMATURE FOR DYNAMO-ELECTRIC MACHINES
Filed July 26, 1940 7 Sheets-Sheet 1

Inventor,
Ernest C. Allen
by Spencer Hardman & Fehr
his attorneys

Dec. 29, 1942.  E. C. ALLEN  2,306,855
ARMATURE FOR DYNAMO-ELECTRIC MACHINES
Filed July 26, 1940  7 Sheets-Sheet 4
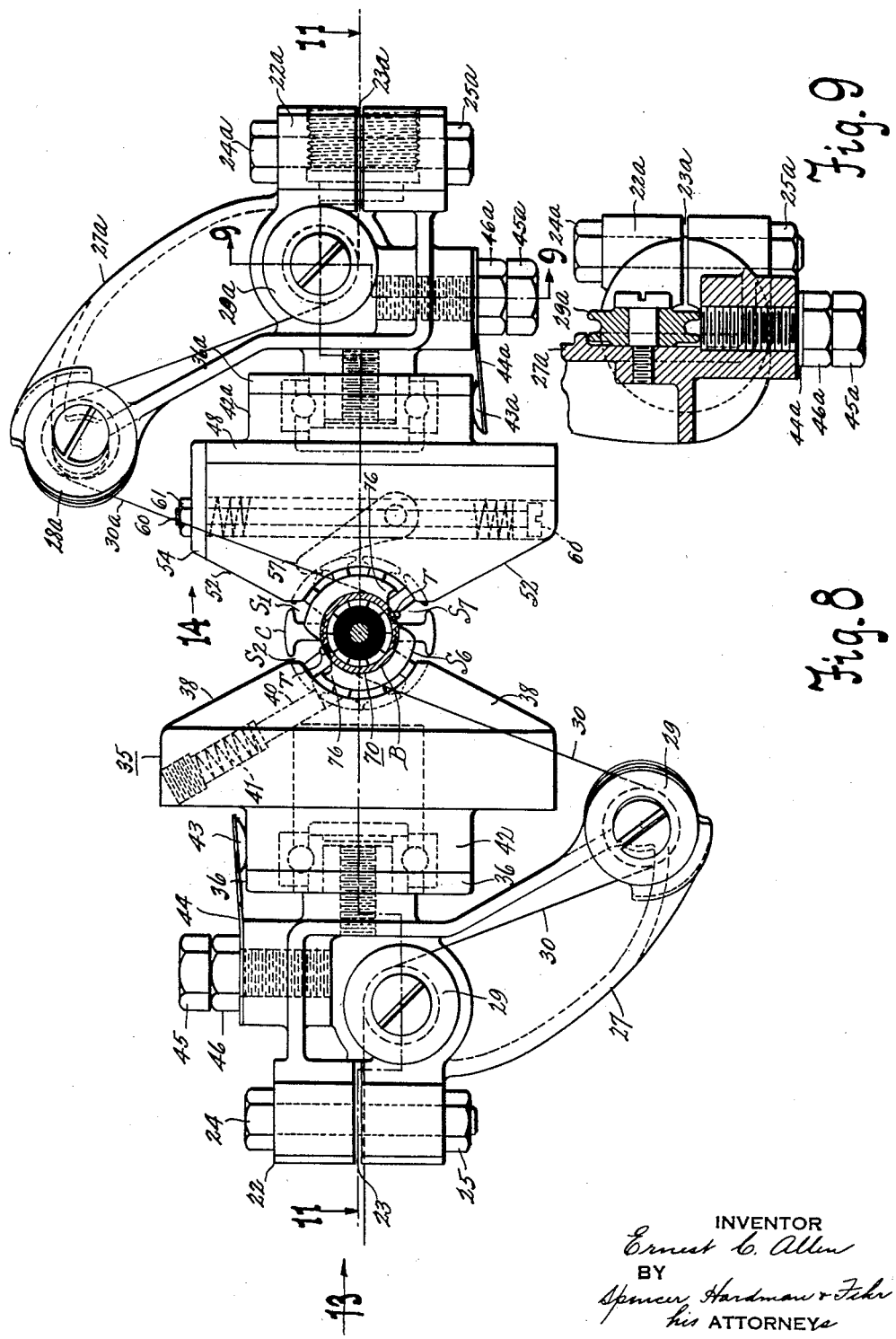
INVENTOR
Ernest C. Allen
BY
Spencer Hardman & Fehr
his ATTORNEYs

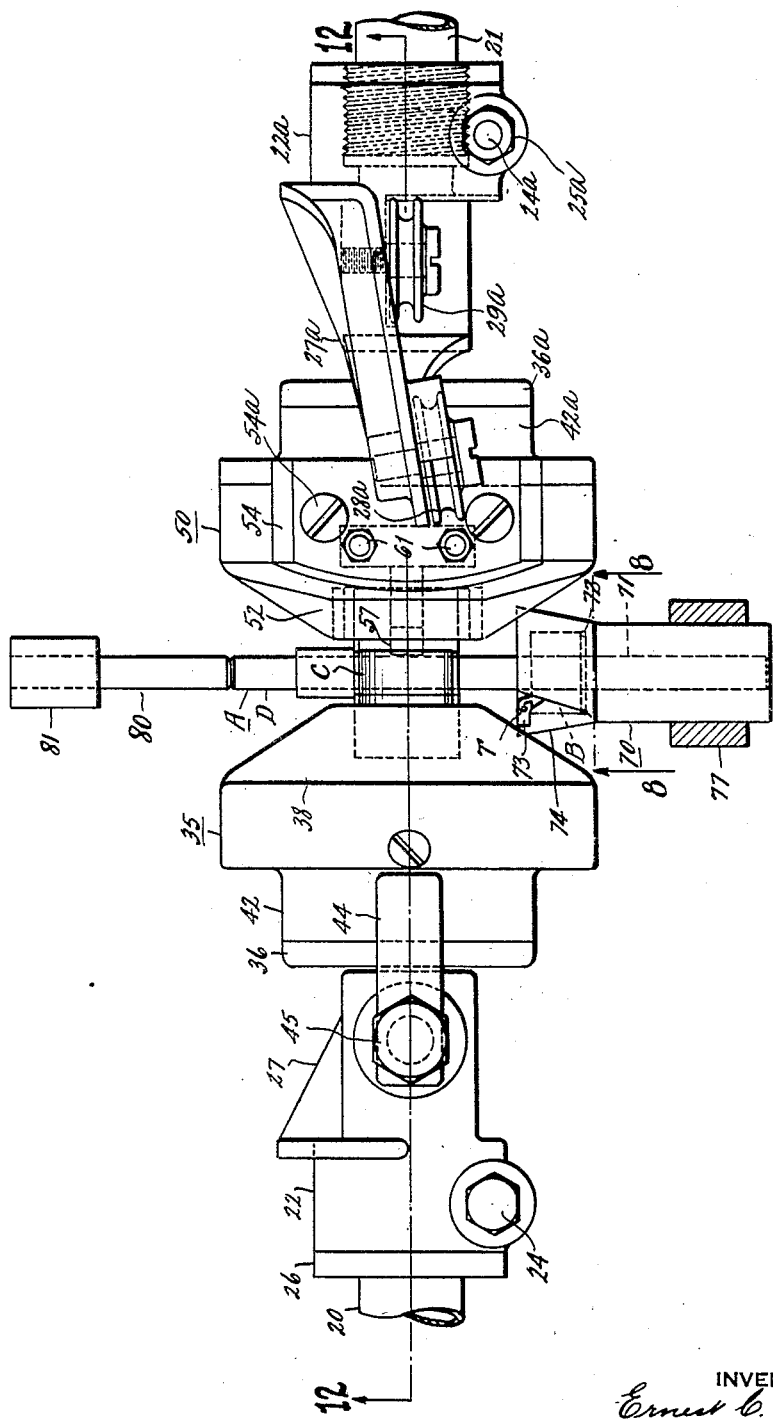

Dec. 29, 1942.  E. C. ALLEN  2,306,855
ARMATURE FOR DYNAMO-ELECTRIC MACHINES
Filed July 26, 1940  7 Sheets-Sheet 6

INVENTOR
Ernest C. Allen
BY
Spencer Hardman & Fehr
his ATTORNEYS

Dec. 29, 1942.  E. C. ALLEN  2,306,855
ARMATURE FOR DYNAMO-ELECTRIC MACHINES
Filed July 26, 1940  7 Sheets-Sheet 7

INVENTOR
Ernest C. Allen
BY
Spencer Hardman Fehr
his ATTORNEYs

UNITED STATES PATENT OFFICE 2,306,855

ARMATURE FOR DYNAMOELECTRIC MACHINES

Ernest C. Allen, Rochester, N. Y., assignor to General Motors Corporation, Detroit, Mich., a corporation of Delaware Application July 26, 1940, Serial No. 347,707

7 Claims. (Cl. 171—206)

This invention relates to the manufacture of armatures for dynamo-electric machines.

It is an object of the invention to wind an armature coil, to connect it with a commutator bar and then continue to wind the next coil without cutting the wire. In other words, the armature will have a series of coils of one continuous length of wire and connected with the proper commutator bars. In accomplishing this object, I provide each commutator bar with a riser tang in the form of a hook. Before starting to wind any of the armature coils, I pass the start lead around the hook and then wind turns of wire upon the armature core to complete the coil. The end lead of the completed coil is passed around the next commutator bar hook and the winding continues as before until all of the coils have been wound. If only one armature were required, obviously the wire would be cut and the loose ends of the series of armature coils would be fastened to commutator bar tangs by twisting the wire around the tangs. In production, however, where a large number of armatures of the same specifications are being wound, it is not necessary for the winder to cut the wires between successive coils, as the severing of the wires joining the armatures can be performed by another operator.

The armature coil wire may be insulated with any material but preferably by insulating varnish. After the winding of an armature, a rotary brush having wire bristles is applied to the commutator bar tangs to remove at least part of the insulation of those portions of the wires which pass around the commutator bar tangs. Then the bared wire and the tangs are fluxed and soldered.

A further object of the invention is to provide a machine by which this method of winding may be carried out. In order to provide a balanced armature, the machine is provided with two winding heads so as to wind in a single operation two symmetrically disposed armature coils. The machine provides means for preventing engagement of the wires with any of the commutator bar hooks except those hooks around which passes the end lead of a preceding coil and the start lead of a succeeding coil. The winding machine provides means for indexing the core into various positions after the armature coils are wound and before proceeding to wind the next succeeding coils. This indexing of the armature so locates the wire to be wound that that portion of the wire forming the end lead of a preceding wound coil and the start lead of a succeeding coil to be wound will be engaged by the exposed commutator bar hook as the winding of the first turn of a new coil is begun. However, the means which leaves only certain commutator bar hooks exposed is so constructed and arranged as to prevent all succeeding turns of an armature coil from engaging even the exposed commutator bar hook.

Further objects and advantages of the present invention will be apparent from the following description, reference being had to the accompanying drawings wherein a preferred embodiment of the present invention is clearly shown.

In the drawings:

Fig. 8 is a front elevation of the two winding heads of the machine with an armature supported between them, the sectional part being taken on the line 8—8 of Fig. 10.

Fig. 9 is a sectional view on line 9—9 of Fig. 8.

Fig. 10 is a plan or top view of the winding heads shown in Fig. 8.

Figure 13:
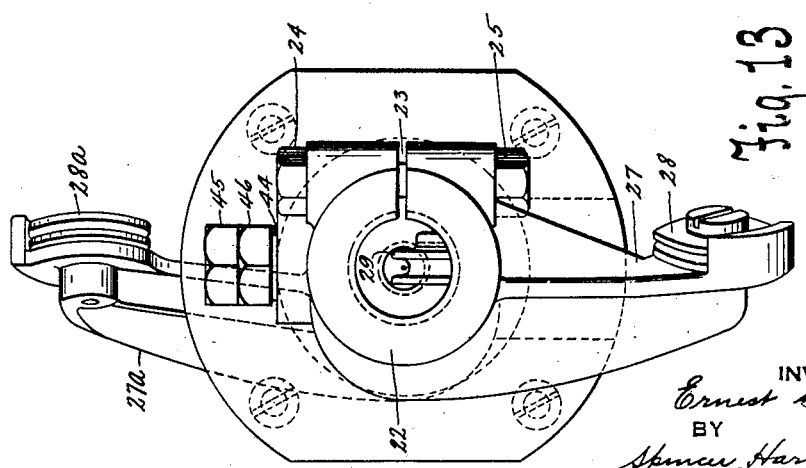
Fig. 13 is a view in the direction of the arrow 13 of Fig. 8.

The winding machine comprises two aligned tubular shafts 20 and 21 which are rotated in opposite directions, shaft 20 being rotated clockwise as viewed in Fig. 13 or in the direction of the arrow 13 of Fig. 8 whereas the shaft 21 rotates counterclockwise as viewed in this direction. Shaft 20 is rotatably connected with a clamping hub 22, split at 23 in order that this hub may be constricted by a bolt 24 and a nut 25 and thus caused tightly to clamp the threaded portion of the tube 20. A lock washer 26 is also employed to aid in the secure fastening of the hub 22 to the tube 20. The hub 22 is integral with a winding arm 27 supporting a groove pulley 28. Hub 22 supports a grooved pulley 29 around which the wire 30 passes in the manner shown in Fig. 8.

Figure 12:
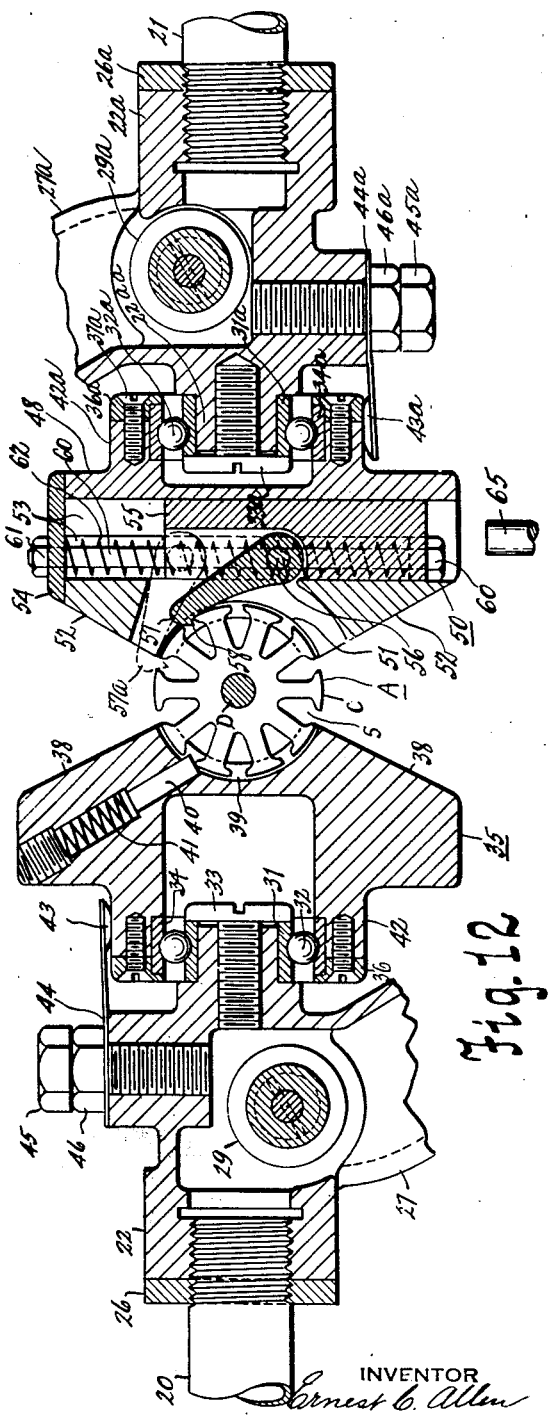
Fig. 12 is a sectional view on line 12—12 of Fig. 10.
Figure 14:
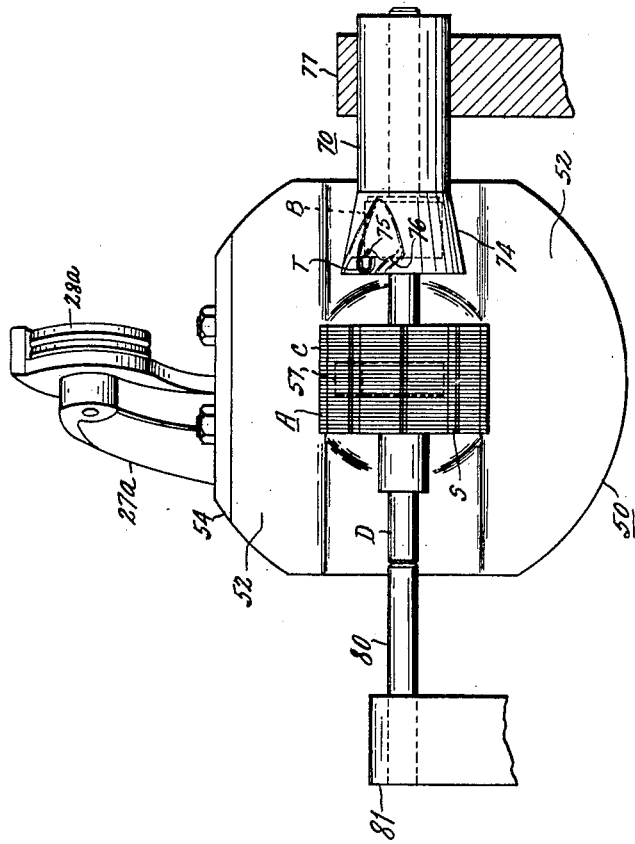
Fig. 14 is a view in the direction of the arrow 14 of Fig. 8.

Hub 22 extends at 22a within the inner race 31 of a ball bearing 32, said inner race being attached to part 22a by screw 33. The outer race 34 of bearing 32 is mounted within a recess provided by a winding head 35 and is retained by a ring 36 secured to head 35 by screws 37. Head 35 is provided with inclined surfaces 38 for guiding the wire into proper slots S of an armature core C mounted on a shaft D and upon which is mounted a commutator B having commutator bars each having a riser tank hook T. The head 35 provides a recess 39 for receiving a portion of the armature core C and covering four of its core teeth. Head 35 carries a detent plunger 40, urged by spring 41 against said core teeth as shown in Figs. 8 and 12 in order to yieldingly retain the core in various positions in which it is located by an indexing mechanism to be described later. Plunger 40 prevents counterclockwise rotation of armature core C.

The armature assembly and the winding head 35 do not rotate during the winding operation. Only the tubular shaft 20 and winding arm 27 rotate in order to wind a coil of wire into those slots in alignment with the surfaces 38 of the head 35. The machine, which rotates the shaft 20, is provided with automatic means for stopping rotation of the shaft 20 after a predetermined number of turns of wire are wound upon the armature. In order that the wire guiding head 35 may remain in loading position while loading the work it is frictionally connected with arm 27 by a brake which includes a brake drum provided by hub 42 of the head 35 and a pressure pad 43, urged by leaf spring 44 against the drum. Spring 44 is fastened to the hub 22 by a screw 45 and a nut 46.

The shaft 21 supports and drives a hub 22a integral with the winding arm similar in construction to the hub 22 and the winding arm 27. The parts driven by the shaft 21 are therefore identified by the reference numerals applied to those parts driven by the shaft 20, but with the affixed a following the reference numerals.

The hub member 42a corresponding to hub 42 of winding head 35 is integral with a plate 48 attached by screws 49 to a winding head 50 having a recess 51 for receiving a portion of the armature core C and enclosing four of its core teeth. Head 50 provides surfaces 52 by which a wire is guided into those core slots which are in alignment with the surfaces 52. The head is provided with a T-shaped groove 53 covered by the plate 48 on the right side as viewed in Fig. 12 and covered by a top plate 54. The groove 53 receives a block 55 carrying a cross-pin 56 pivotally supporting an indexing dog 57 having a tooth 58 adapted to be received between the adjacent core teeth of the core. The block 55 is provided with laterally extending lugs 59 which are apertured to receive bolts 60, threadedly connected at their upper ends with the plate 54 and locked in adjusted position by nuts 61. Springs 62 are received by the grooves 53 and surround the bolts 60 and engage the lugs 59 of block 55 in order to urge these lugs downwardly against the heads of the screws 60. Therefore, the block 55 is normally in the position shown in Fig. 12. In order to index the armature core in a clockwise direction the operator, by pressing a pedal not shown, causes a rod 65 to move upwardly and engage the underside of the block 55 and cause the same to move upwardly until dog 57 strikes the head 52. During this movement of the block 55, the dog 57 will move into the position indicated at 57a to engage in the core slot in alignment with the upper surface 52 of head 50. When the operator releases the pedal which controls rod 65, rod 65 will descend, thereby permitting the springs 62 to move the block 55 downwardly in order to return the pawl 57 to its normal position and to cause the armature core to be indexed an angular distance equal to the angle between the adjacent core slots as shown in Figs. 6 and 8.

Figure 6:
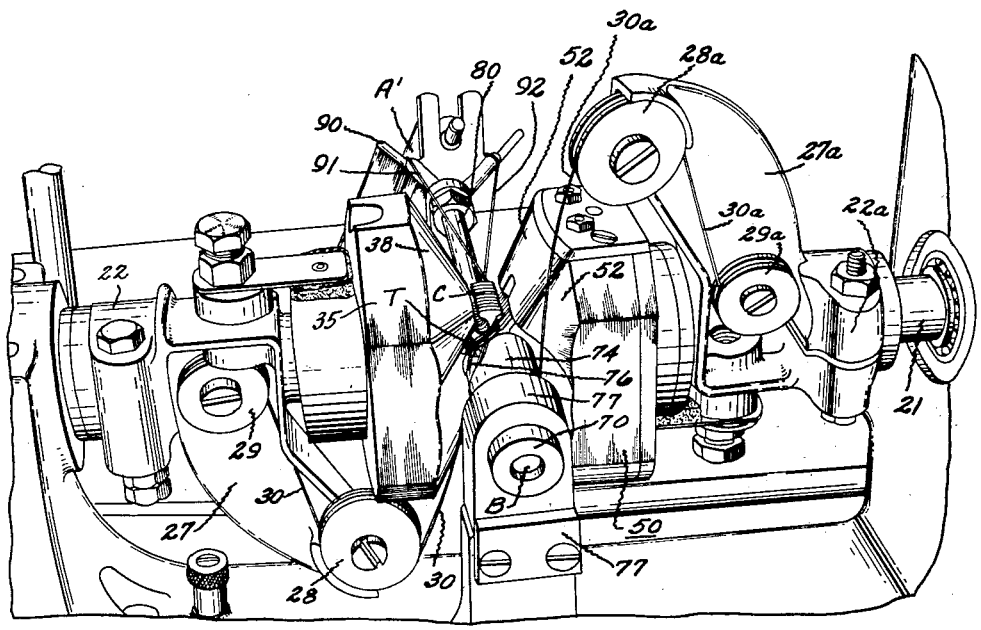
Fig. 6 is a perspective view showing the completion of the first coil and its end lead passing around another commutator bar hook preparatory to beginning to wind the second armature coil.
Figure 7:
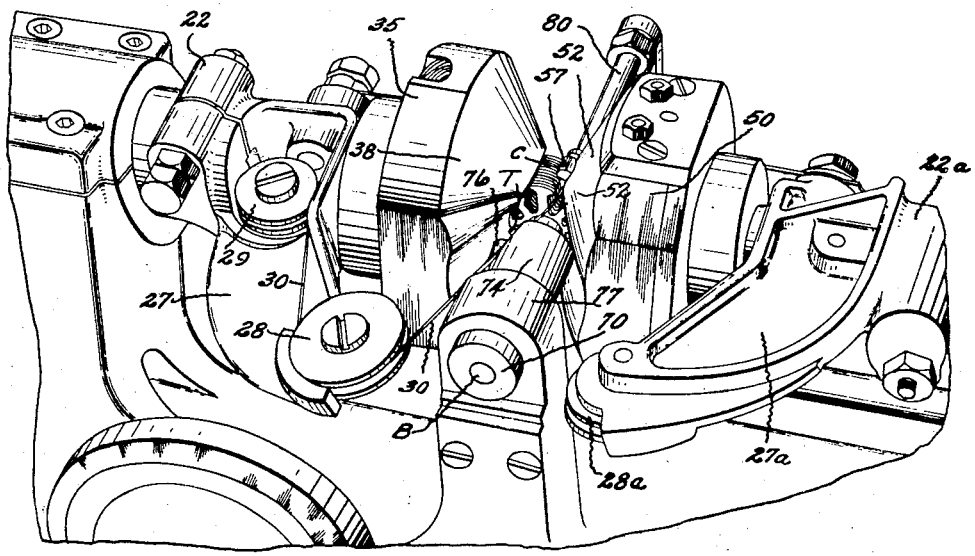
Fig. 7 is a view similar to Fig. 5 taken from another angle and showing an end of the indexing dog.

The wire 30a which passes through the tubular shaft 21, passes around guide pulley 29a and winding arm pulley 28a and is guided into the proper core slots as shown in Fig. 6 by the surfaces 52 of the head 50. Due to the operation of the two oppositely rotating winding arms 27 and 27a, the wires 30 and 30a are simultaneously wound upon the armature core C so that two coils are wound simultaneously upon the armature core. These coils are symmetrically disposed with respect to the armature and are of the same length and have the same weight. When an armature having 10 slots such as shown in Fig. 8 has been wound, it will have five pairs of symmetrically disposed armature coils. Hence the armature will be in balance.

Figures 1, 2:
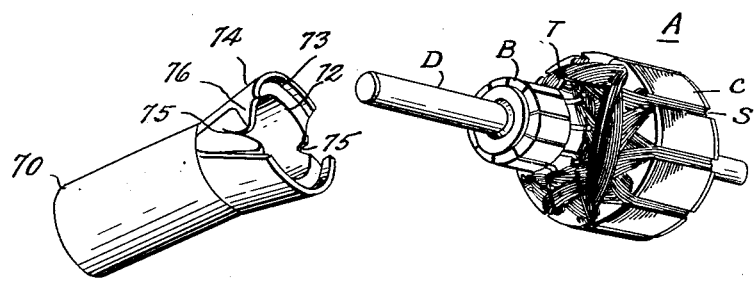
Fig. 1 is a perspective view of an armature which is constructed in accordance with the present invention.
Fig. 2 is an element of the coil winding machine which is used to cover up all commutator bar hooks except those which are to receive portions of wires which form the end lead of a preceding coil and the start lead of a succeeding coil.
Figure 3:
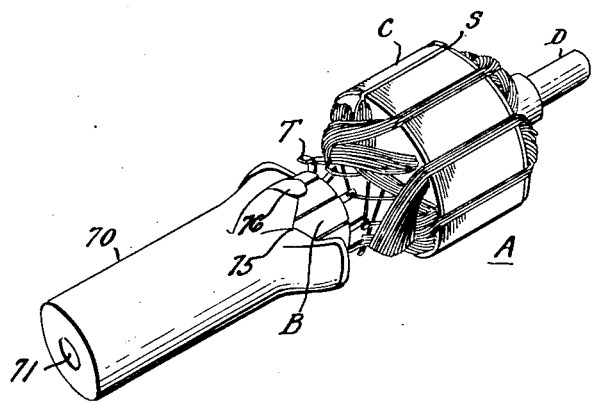
Fig. 3 shows the armature of Fig. 1 and the device of Fig. 2 in partly assembled relation.

While being wound, the armature is supported not only by the winding heads 35 and 50 but also by the device which covers all the commutator bar hooks except those around which portions of wire are passed, said wires forming the end leads of preceding coils and start leads of succeeding coils. This device, designated in its entirety by numeral 70, is shown best in Figs. 2, 3 and 8; and will be designated hereafter as the commutator guard. The guard 70, generally tubular in formation and has a central bore 71 for receiving a portion of the armature shaft D. It also provides a tubular recess 72 for receiving the commutator B and also with a counterbore 73 for receiving the annular row of commutator riser tang hooks T. The exterior surface of the guard 70 is partly cylindrical but the exterior of the end portion which receives the commutator D is frustoconical to provide a wire guiding surface 74. Diametrically opposite portions of the surface 74 are cut away to provide notches 75 with which diametrically opposite hooks T of the commutator will be aligned when the armature is mounted between the winding heads 35 and 50 and is located by detent 40 and the dog 57. Fig. 3 shows the alignment of one of the notches 75 with a tang hook T as the armature A is being assembled with the guard 70. The portions 76 of the guard 70 adjacent the notches 75 provide camming surfaces for directing the wire in the proper manner.

Figure 4:
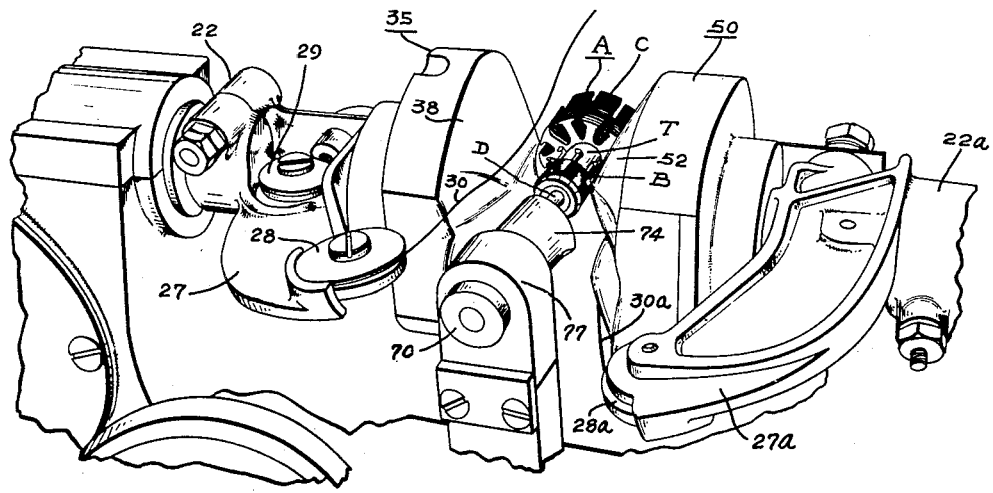
Fig. 4 is a perspective view showing the act of placing an empty armature upon the machine.

Fig. 4, shows the operator in the act of placing an empty armature between the winding heads 35 and 50. In order to facilitate the mounting between these heads, one of them may be moved away from the other in a direction axially of its driving shaft. Preferably the shaft 20 is fixed against axial movement, but shaft 21 is so mounted that it can be axially moved in order to move the head 50 relative to the head 35. After the armature A is located between the heads 35 and 50, it is pushed toward the guard 70 as far as the guard will permit, the guard being mounted on a fixed support 77. The armature is retained upon the guard 70, with its tang hooks T within the recess 73 of the guard, by a rod 80 carried by a movable support 81 which is caused to move against the end of the armature shaft D after the armature A has been mounted upon the guard 70 as shown in Fig. 10. No disclosure is made of the means for axially moving the shaft 21 or the rod 80, since these mechanisms form no part of the present invention. These movements may be coordinated if desired in order that one control lever or pedal may cause both the shaft 21 and the rod 80 to be retracted from the nonmovable head 35 and then be advanced simultaneously after the armature A has been mounted upon the guard 70.

Figure 5:
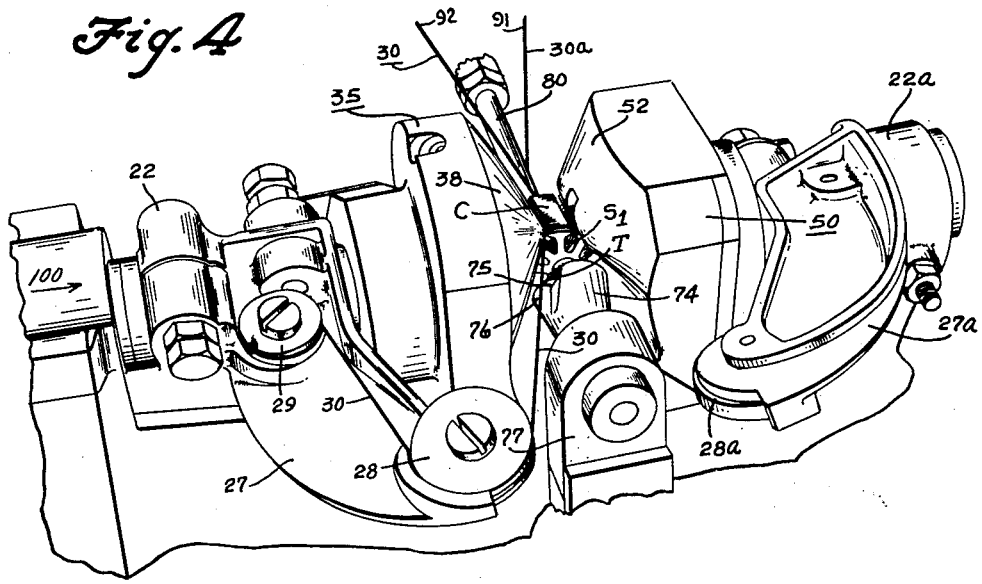
Fig. 5 is a perspective view of the machine and armature showing how the start lead of the first coil passes around the exposed commutator bar hook and how the first turn of that coil escapes the hook.

After the armature has been mounted upon the guard 70 and the head 50 and the rod 80 have been advanced to operating position, the operator manually inserts into certain slots of the empty armature core C the wires extending from the previously wound armature. This armature is shown at A' in Fig. 8 and is guided by a chute 90 while descending into a suitable receptacle. These end leads are indicated at 91 and 92. As the manipulation of these leads 91 and 92 and the winding of the wires 30 and 30a are identical, only the manipulation of the lead 91 and winding of the wire 30 will be described in detail. The operator places the wire portion 91 in the slot S1, Fig. 5. As the result of this procedure, the wire 30 leading from a supply reel through the tubular shaft 20 and passing around the guide pulleys 29 and 28 and then through the slot S1, will be caught on a tang hook T when the winding machine is power operated to cause the winding arm 27 to rotate clockwise as viewed in the direction of the arrow 100 in Fig 5. The notch 75 of guard 70 is in such position that the exposed tang T will be the proper tang to be engaged by the wire. Then the wire is wound in the slots S2 and S6. As the winding arm 27 completes its first revolution, it locates the wire 30 in the position shown in Fig. 5. As the wire 30 is moved downwardly against the camming surface 76 of the guard 70, it avoids contact with the hook T. The surface 76 guides the wire in such a manner that the wire is caused to pile upon the end of the armature core as shown in Fig. 1.

The winding arm 27 continues to rotate until it is automatically stopped, following the winding of a predetermined number of turns of wire for each armature coil. Then the operator presses a pedal which elevates the rod 65 in order to raise the dog 57 to the position 57a and to compress the springs 62. Then the operator releases the pedal which allows the rod 65 to descend and the springs 62 to expand to cause the dog 57 to return to its normal position which will cause clockwise rotation of the armature A so that slots S2 will be carried to the position normally occupied by slot S1. This indexing of the armature changes the relation of the wire 30 with respect to any hook which is exposed by the guard 70. Therefore, when starting to wind the next coil, that portion of the wire which extends from the last turn of the preceding coil passes around a tang hook T again before being wound upon the armature core. Therefore, the wire 30 will be a continuous wire joining all of the five coils which are wound on the core by rotation of the winding arm 27. Between each one of these five coils there will be a portion of wire connected with a commutator tang hook. The wire 30a is similarly wound upon the core C by rotation of the winding arm 27a in a counterclockwise direction, looking in the direction of 100 in Fig. 5. The wire 30a will, therefore, be a continuous wire including five armature coils and portions of wire passed around commutator tang hooks. After each slot of the armature core has received active-coil-side-portions of two coils, the armature is completed and is removed from the machine and placed upon the chute 90.

After these armatures have collected in the chute or in a receptacle at the bottom of the chute, they are severed from each other by cutting the continuous wires 30 and 30a which join them. The loose ends of the wires 30 and 30a are wound around proper tank hooks and the excess wire is trimmed off. Then the commutator risers are subjected to a rotary brush having wire bristles which remove the greater portion of the insulation of the wire (such as insulating enamel) adjacent each of the riser tang hooks T. The bared wire portions and the tangs are then fluxed and soldered.

Figure 11:
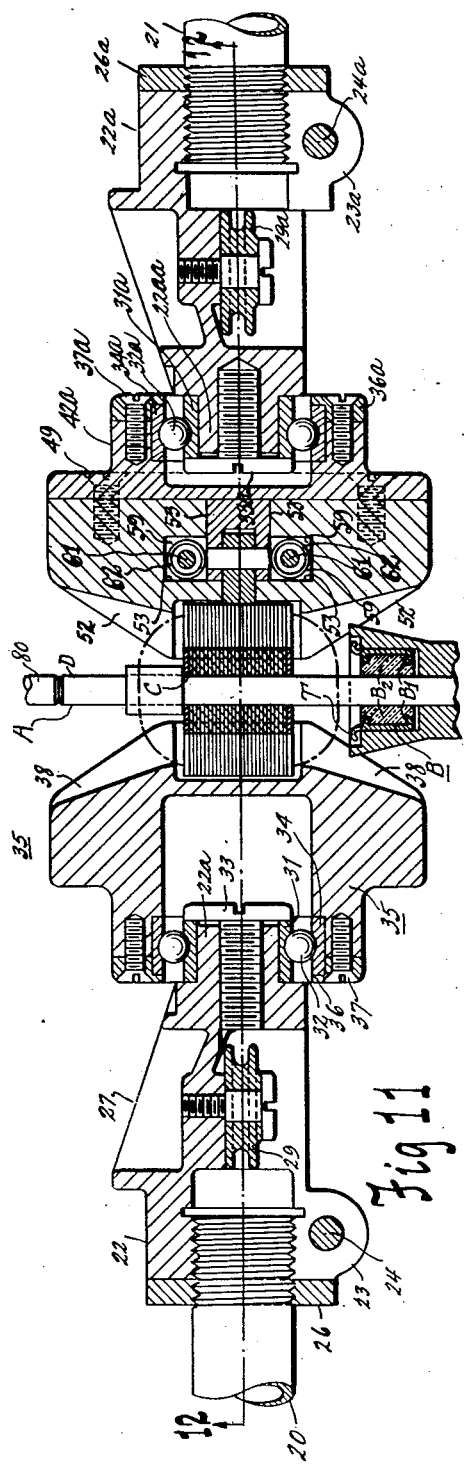
Fig. 11 is a sectional view on line 11—11 of Fig. 8.

The commutator which is used is preferably of the form described and claimed in the patent of Vincent G. Apple 1,578,793. This commutator is formed from a single strip of sheet copper bent into cylindrical form and provided with tangs B1 (Fig. 11) which are embedded in a Bakelite hub B2. This cylindrical band is divided into segments preferably after assembly on shaft D following the operation of soldering the wires to the tang hooks. The armature assembly is then placed in a lathe and the commutator surface is trimmed in order that it will be concentric with the armature shaft.

While the embodiments of the present invention as herein disclosed, constitute a preferred form, it is to be understood that other forms might be adopted, all coming within the scope of the claims which follow.

What is claimed is as follows:

1. The method of making an armature for dynamo-electric machines, said armature having a series of coils formed from a continuous length of wire, which consists in assembling, with the armature shaft and slotted core, a commutator having an annular row of spaced riser tang hooks, in placing the start lead of a coil of insulated wire to be wound in contact with the proper hook for subsequently making connection with the proper commutator segment, in winding the wire into certain spaced slots while avoiding the engagement of the wire with any tang hook, in placing the end lead of the completed coil around the hook next to make connection with the lead lead of the completed coil and with the start lead of the next coil to be wound, in winding the next coil as before, repeating the procedure until the required number of coils have been completed from a continuous length of wire, in severing the end lead of the last coil of the series of coils from the supply of wire, in fixing the said end lead around the proper tang hook, and thereafter in removing the insulation from the portions of the wire located around the tang hooks and in electrically connecting the bared wire portions with the tang hooks.

2. The method according to claim 1, in which the step of removing the insulation from the wire portions engaging tang hooks is performed by causing said wire portions to be engaged by a rotary wire-bristle brush.

3. The method of making an armature for dynamo-electric machines which consists in assembling, with the armature shaft and slotted core, a commutator having an annular row of spaced riser tang hooks, in winding upon the core pairs of symmetrically disposed coils from two continuous lengths of insulated wire, the procedure before winding the first pair of coils being to place their start leads around certain tang hooks of the commutator, the procedure before winding succeeding coils being to place the end leads of completed pairs of coils around the proper tang hooks before winding the next succeeding pairs of coils, avoidance of the engagement of any coil turn with a tang hook being followed during the winding operations, then in severing the end leads of the last pair of coils to be wound from the two wires not on the core, in fixing said end leads to proper tang hooks, and thereafter in removing insulation from the portions of the wire located around the tang hooks and in electrically connecting the bared wire portions with the tang hooks.

4. The steps in the method of making an armature having a series of connected coils wound upon an armature core from a continuous length of wire having portions intermediate the coils connected with risers of a commutator assembled on a shaft with the core which consist in passing the end lead of a completed coil around the proper riser of the commutator and then into the first receiving core slot for the next coil and in winding the next coil into core slots while avoiding engagement of a coil turn with any commutator riser.

5. An armature for dynamo-electric machines having a slotted core assembled with a shaft and a commutator having riser tangs and having coils wound into the core slots, said coils being formed from a continuous length of insulated wire including coil-lead-forming portions, between successive coils, which portions pass around riser tangs, the wire portions passing around the tangs being electrically connected therewith.

6. An armature for dynamo-electric machines having a slotted core assembled with a shaft and a commutator having riser tangs and having coils wound into the core slots, said coils being formed from a continuous length of insulated wire including coil-lead-forming portions between successive coils, which portions pass around riser tangs, the wire portions passing around the tangs being bare of insulation and soldered to the tangs.

7. An armature for dynamo-electric machines having a slotted core assembled with a shaft and a commutator having riser tangs and having a plurality of pairs of symmetrically disposed coils wound into the core slots consisting of two continuous lengths of wire, each wire length including a coil of each pair of coils, and that portion of wire providing the end lead of a preceding coil and the start lead of a succeeding coil passing around a commutator riser tang and being there bare of insulation and electrically connected with the riser tang.

ERNEST C. ALLEN.